United States Patent Office 3,361,584
Patented Jan. 2, 1968

3,361,584
CHROMITE REFRACTORY
Marshall L. Mayberry, San Jose, Calif., assignor to Kaiser Aluminum & Chemical Corporation, Oakland, Calif., a corporation of Delaware
No Drawing. Filed Feb. 9, 1967, Ser. No. 614,828
7 Claims. (Cl. 106—59)

ABSTRACT OF THE DISCLOSURE

Disclosed is an unfired refractory made of chromite and having enhanced strength at intermediate temperature by virtue of its containing at least 20% —325 mesh chromite or at least 15% —325 mesh chromite together with from about 0.5% to about 2.0% fine amorphous silica such as volatilized silica.

---

This application is a continuation-in-part of application S.N. 445,754, filed Apr. 5, 1965, now abandoned.

Background

This invention concerns refractory shapes made of chromite.

While many refractory products are intended and designed for use at high temperatures, for example at temperatures of 1400° C. and above, there is a demand for refractories which will not be subjected to temperatures above an intermediate temperature, for example about 1000° C., but which are required to exhibit excellent properties, for example strength, at these intermediate temperatures.

While it would be possible to use, at these intermediate temperatures, refractories which have been fired to high temperatures to develop a strong ceramic bond, this often proves uneconomic, since fired or ceramically bonded refractories are generally more expensive. Thus, it is often desirable to use at these intermediate temperatures refractories which are chemically bonded, that is to say those having a cold or room-temperature setting cement or bond. However, such chemically bonded refractories generally show a minimum in their strength versus temperature characteristic at intermediate temperatures, for example from about 700° C. to about 1000° C. This is due to the fact that the chemical bond, which often is an organic material, deteriorates upon being heated to these temperatures but the high temperaure ceramic bond has no yet completely developed.

Summary

There has now been discovered, according to this invention, a chemically bonded refractory, particularly a refractory shape, which exhibits superior strength at intermediate temperatures. The refractory constituent of such a shape is essentially raw chrome ore in the form of grade-sized particles. The sizing of the particles is such that from about 20% to about 30% by weight of the particles pass a 325 mesh screen, from about 20% to about 40% by weight pass a 100 mesh screen, and from about 15% to about 35% by weight pass a 28 mesh screen and are retained on a 100 mesh screen, the balance being particles retained on a 28 mesh screen. The —100 mesh fraction includes, of course, those particles passing a 325 mesh screen.

Detailed description

The refractory particles consist essentially of sized chrome ore and are substantially free of magnesia material other than the MgO which, as is well known, occurs in combination with other oxides as one or more of the constituents of the chrome ore itself. In other words, there is no addition of magnesia or other refractory material to the chrome ore.

The chrome ore is sized according to good refractory practice to achieve a dense or close packed structure. For example, it will contain from about 25% to 65% by weight coarse particles, for example passing a 4 mesh screen and retained on a 28 mesh screen; from about 15% to about 35% by weight of intermediate particles, for example passing a 28 mesh screen and retained on a 100 mesh screen; and from about 20% to about 40% by weight of fine particles, for example passing a 100 mesh screen, including, as mentioned above, from about 20% to about 30% by weight of particles passing a 325 mesh screen.

While any chrome ore can be used in the refractory shape according to this invention, chrome ores containing less than 40% $Cr_2O_3$, for example the chrome ore mined in the Philippines and known as Masinloc chrome ore, and that mined in Turkey, are found to be particularly suitable.

The sized chrome ore is mixed with chemical bond, for example waste sulfite liquor, as is well known in the art, and is formed into shapes, for example under pressure.

It has also been discovered, according to this invention, that the strength at intermediate temperatures, for example the modulus of rupture of 954° C., of chromite refractories can be maintained even though the refractory contains less than 20%, for example as little as 15%, chromite passing a 325 mesh screen if there is added to the refractory from about 0.5% to about 2.0% of a very finely divided amorphous silica such as volatilized silica. As is well known in the art, volatilized silica is produced as a by-product in the production of ferrosilicon, the silica being deposited from the vapors issuing from the zone wherein iron oxide, carbon, and silica are reacted to form ferrosilicon. Typically, the volatilized silica of commerce has a $SiO_2$ content of at least 90% and generally about 95%; the iron, magnesium and aluminum oxides present total about 2.5%, other impurities amount to about 0.5%, and there is typically a 2% ignition loss. This ignition loss is substantially all due to the carbon content of material. Typically, the average particle size of volatilized silica is less than 1 micron and the specific surface is more than 50,000 square centimeters per gram. While volatilized silica, as described above, is a preferred material for use in this invention, other equivalent finely divided silicas may be substituted.

It will be understood, of course, that a finely divided amorphous silica such as volatilized silica can be included in compositions according to this invention containing over 20% chrome ore passing a 325 mesh screen.

The refractory shapes according to this invention are particularly useful in applications calling for relatively high strength at intermediate temperatures, for example in constructing the lower courses of regenerators or heat exchange structures for glass tanks. As is known in the art, these regenerators are open refractory checkerwork structures through which gases can pass, hot combustion gases passing down through the checkwork during one portion of the firing cycle to heat the refractories, and incoming gases for combustion, usually air, coming up through the heated checkers to be preheated before reaching the burners during the alternate portion of the cycle.

Examples

Illustrative but not limiting examples of specimens according to this invention are given in Table I. Each of the compositions shown was made of sized Masinloc chrome ore or chromite having the percent particles passing a 325 mesh screen indicated in the second column. In each composition, 39.1% of the chrome ore passed a 4 mesh and was retained on a 28 mesh screen, 23.9% passed 28 mesh and was retained on a 100 mesh screen, given in Table II, it can be seen that both these ores contain less than 40% $Cr_2O_3$, whereas the Transvaal and Southern Rhodesian ores had over 40% $Cr_2O_3$.

TABLE II

| Specimen | Type Chrome Ore | Sizing (percent −325 mesh) | Strength (p.s.i.) (Modulus of Rupture, 954° C.) | Density (lb./ft.³) | Chemical Composition | | | | | |
|---|---|---|---|---|---|---|---|---|---|---|
| | | | | | $SiO_2$ | $Fe_2O_3$ | $Al_2O_3$ | $Cr_2O_3$ | CaO | MgO |
| M | Masinloc | 23.5 | 1,302 | 208 | 5.54 | 14.33 | 27.87 | 29.88 | 0.84 | 21.54 |
| N | Transvaal | 27.1 | 1,028 | 231 | 2.43 | 27.00 | 13.90 | 44.37 | 0.48 | 11.82 |
| P | Turkish | 23.8 | 1,205 | 210 | 7.28 | 15.32 | 21.69 | 36.02 | 0.63 | 19.06 |
| Q | S. Rhodesian | 25.1 | 642 | 214 | 6.35 | 12.20 | 15.13 | 48.00 | 1.04 | 17.28 | the balance passing a 100 mesh screen. Masinloc chrome ore has the typical chemical composition given in Table II. The sized chrome ore was mixed with 2% by weight of a powdered calcium magnesium lignin sulfonate as binder and about 2% tempering water, and pressed into shapes about 3 by 4½ by 9 inches under a pressure of about 5 tons per square inch. The modulus of rupture of these specimens was measured at 954° C., the values determined being given in the third column of Table I.

TABLE I

| Specimen | Sizing (Percent −325 mesh) | Strength (p.s.i.) (Modulus of Rupture, 954° C.) | Density (pcf.) | Refractory Addition |
|---|---|---|---|---|
| A | 19.4 | 677 | 202 | None. |
| B | 19.7 | 777 | 209 | Do. |
| C | 23.3 | 1,025 | 207 | Do. |
| D | 23.8 | 1,089 | 210 | Do. |
| E | 25.5 | 1,206 | 206 | Do. |
| F | 23.3 | 815 | 205 | 5% periclase. |
| G | 23.3 | 705 | 203 | 10% periclase. |

Specimens C, D and E, each containing over 20% material passing a 325 mesh screen and each exhibiting a modulus of rupture at 954° C. of over 1000 p.s.i., illustrate the superiority of shapes made from compositions according to this invention.

Specimens F and G, to be compared with specimen C, were of the same sizing as specimen C and prepared in the same manner except that they contained, respectively, 5% and 10% by weight periclase grain. A comparison of the modulus of rupture of specimens F and G with that of specimen C shows the deleterious effect of additions of magnesia. Thus, while magnesia, in general, enhances the high temperature refractory properties of chrome-magnesite compositions, it has been found to be injurious to the intermediate temperature properties of the all-chrome compositions of this invention.

It is important to realize that the effect of the sizing of the chrome ore is not merely one of enhancing the density or packing of the refractory material. From the density figures given in the fourth column of Table I, it can be seen that there is no correlation between the strength and the density of the shape.

In Table II are presented data on specimens made according to this invention from different chrome ores, the source of the chrome ore being indicated in the second column of the table. Each specimen had 39.1% of the chrome ore in the 4 x 28 mesh fraction and 23.9% in the 28 x 100 mesh fraction, the remainder being −100 mesh. All the specimens had an amount of −325 mesh material greater than the minimum 20% required by this invention, the precise amount being indicated in Table II. It can be seen that the highest strengths (modulus of rupture at 954° C.) were attained in the Masinloc and Turkish chrome ores. From the chemical analyses also As an example of a composition according to this invention wherein volatilized silica was added and the intermediate temperature strength maintained even though the composition contained less than 20% chromite passing a 325 mesh screen, a composition R, consisting of 56.5 parts of chromite passing a 4 mesh screen and retained on a 28 mesh screen, 18.5 parts chromite passing a 28 mesh screen and retained on a 100 mesh screen, 25.0 parts chromite passing a 100 mesh screen, including 15.0 parts passing a 325 mesh screen, 1.94 parts of the binder used in the specimens of Table I, and 1.2 parts volatilized silica was mixed with 1.5 parts water. The resulting mixture was formed into standard refractory shapes with a density of 209 pounds per cubic foot after drying at 150° C. The modulus of rupture of these shapes was 1610 p.s.i. (average of eight specimens) at 954° C. The strength of this composition R is to be compared with the strengths of specimens A and B (Table I), which were less than half that of specimen R.

In the specification and claims, percentages and parts are by weight unless otherwise indicated. Mesh sizes referred to herein are Tyler standard screen sizes which are defined in Chemical Engineers' Handbook, John H. Perry, editor-in-chief, third edition, 1950, published by McGraw-Hill Book Company, at page 963. For example, a 100 mesh screen opening corresponds to 147 microns, and 200 mesh to 74 microns. Analyses of mineral components are reported in the usual manner, expressed as simple oxides, e.g., MgO, $SiO_2$, although the components may actually be present in various combinations, e.g., as a magnesium silicate.

Having now described the invention, what is claimed is:

1. A chemically bonded refractory shape, the refractory constituent of which consists essentially of sized particles of chrome ore, from about 20% to about 30% by weight of said particles passing a 325 mesh screen, from about 20% to about 40% by weight of said particles passing a 100 mesh screen, and from about 15% to about 35% by weight of said particles passing a 28 mesh screen and being retained on a 100 mesh screen, the balance of said particles passing a 4 mesh screen and being retained on a 28 mesh screen, said refractory constituent being substantially free of magnesia other than the MgO contained in the chrome ore itself.

2. A refractory shape according to claim 1 containing, as chemical bond, a lignin sulfonate.

3. A refractory shape according to claim 1 wherein said chrome ore contains less than 40% $Cr_2O_3$.

4. A refractory shape according to claim 1 containing from about 0.5% to about 2.0% finely divided amorphous silica.

5. A refractory shape according to claim 4 wherein said finely divided amorphous silica is volatilized silica.

6. A chemically bonded refractory shape, the refractory constituent of which consists essentially of sized particles of chrome ore, from about 15% to about 30% by weight of said particles passing a 325 mesh screen, from about 20% to about 40% by weight of said particles passing a 100 mesh screen, and from about 15% to about 35% by weight of said particles passing a 28 mesh screen and being retained on a 100 mesh screen, the balance of said particles passing a 4 mesh screen and being retained on a 28 mesh screen, said refractory constituent being substantially free of magnesia other than the MgO contained in the chrome ore itself, said shape containing from about 0.5% to about 2.0%, based on the total weight of the refractory shape, of finely divided amorphous silica.

7. A refractory shape according to claim 6 wherein said finely divided amorphous silica is volatilized silica.

References Cited

UNITED STATES PATENTS

| | | | |
|---|---|---|---|
| 1,851,181 | 3/1932 | Heuer | 106—55 |
| 1,992,483 | 2/1935 | Heuer | 106—59 |
| 2,068,411 | 1/1937 | Heuer | 106—59 |
| 3,199,994 | 8/1965 | Davies | 106—66 |

TOBIAS E. LEVOW, *Primary Examiner.*

J. E. POER, *Assistant Examiner.*